United States Patent [19]

Tsujimoto et al.

[11] 3,960,479
[45] June 1, 1976

[54] COLORING OF ORGANIC MATERIALS WITH ASYMMETRIC THIOINDIGOID COMPOUNDS

[75] Inventors: Michihiro Tsujimoto, Tachikawa; Tsutomu Nishizawa, Kamakura; Ichiro Okubo, Hachioji, all of Japan

[73] Assignee: Mitsui Toatsu Chemicals, Incorporated, Tokyo, Japan

[22] Filed: Apr. 30, 1975

[21] Appl. No.: 573,102

[30] Foreign Application Priority Data
May 9, 1974   Japan................................ 49-50686

[52] U.S. Cl............................................ 8/36; 8/38;
                                                  8/179; 8/DIG. 4
[51] Int. Cl.² ........................................ D06P 1/22
[58] Field of Search.................................. 8/38, 36

[56] References Cited
UNITED STATES PATENTS

| | | | |
|---|---|---|---|
| 2,663,612 | 12/1953 | Gibson...................................... | 8/34 |
| 2,663,613 | 12/1953 | Gibson...................................... | 8/37 |
| 3,047,352 | 7/1962 | Santoro et al. ............................ | 8/3 |
| 3,527,556 | 9/1970 | Riley........................................ | 8/17 |

FOREIGN PATENTS OR APPLICATIONS 2,401,981   8/1974   Germany

OTHER PUBLICATIONS

Venkataraman, K., "The Chemistry of Synthetic Dyes" (Academic Press, New York, 1952) vol. II, pp. 1003-1045.

Venkataraman, K., "The Chemistry of Synthetic Dyes" (Academic Press, New York, 1970) vol. III, pp. 36-37.

*Primary Examiner*—Joseph L. Schofer
*Assistant Examiner*—A. L. Clingman
*Attorney, Agent, or Firm*—Sherman & Shalloway

[57] ABSTRACT

Method of coloring an organic material with an asymmetric thioindigoid compound having the formula:

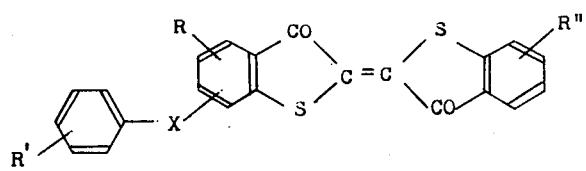

wherein R is a hydrogen atom or lower alkyl; R' is a member selected from the group consisting of a hydrogen atom, halogen atoms, lower alkyl groups, lower alkoxy groups, sulfonamide group or its derivatives, and aryl sulfonate groups or their derivatives; R'' is a hydrogen atom or methyl group; and X is an oxygen atom or sulfur atom. Organic materials colored with the compound have a brilliant nuance with characteristic fluorescence.

8 Claims, No Drawings

COLORING OF ORGANIC MATERIALS WITH ASYMMETRIC THIOINDIGOID COMPOUNDS

BACKGROUND OF THE INVENTION

This invention relates to a method for coloring organic materials, especially textiles, with asymmetric thioindigoid compounds.

The prior art has made little use of thioindigo derivatives as dyestuffs for synthetic organic materials, especially for polyester fibers, although many thioindigo derivatives have been used for dyeing natural fibers (for example, cotton). Recently, brilliant nuance has been desired in colored articles, especially in weaving apparel, while polyester materials colored with ordinary dyestuffs for polyester show a duller hue than the other colored synthetic organic materials (for example, polyacrylonitrile fabrics). Thus, brilliant dyestuffs for polyester materials have been sought.

This situation is also testified by the invention of "cationic dye-dyeable polyester" that shows more brilliant hue by dyeing with cationic dyes than the hue of ordinary polyester materials dyed with ordinary dyes for polyester. On the other hand, the thioindigoid compounds show brilliant coloring effects but little dyeability for polyester materials, and therefore thioindigoid dyes for polyesters have scarcely been known except that unsubstituted thioindigo is applied only in limited uses.

The present inventors have previously discovered that certain asymmetric thioindigoid compounds can be effectively used as dyes for the coloring of organic materials, especially for polyester fibers (West Germany, OLS No. 2,401,981). The asymmetric thioindigoid compounds employed in the OLS No. 2,401,981 are good for dyeing the organic materials in a wide color range of red to violet, but their dyeing properties are not necessarily satisfactory in the color range of reddish orange to red. It is desired therefore to find new asymmetric thioindigoid compounds having even better dyeing properties in a color range of reddish orange to red.

As a result of intensive colorant tests an organic materials colored with the thioindigoid compounds, it has now been discovered that the compounds of formula (I) below color synthetic organic high molecular weight compounds, especially polyester materials, in a reddish orange to red color of brilliant nuance with characteristic fluorescence. Besides, recently α-aminoanthraquinone, the most important intermediate for reddish diperse anthraquinone dyes, has caused difficult problems on environmental pollution because of using a mercury catalyst for manufacturing it. The new thioindigoid compounds used in this invention can be obtained without using mercury and color in more brilliant nuance than the anthraquinone derivatives.

SUMMARY OF THE INVENTION

This invention relates to a method of coloring an organic material with an asymmetric thioindigoid compound having the formula:

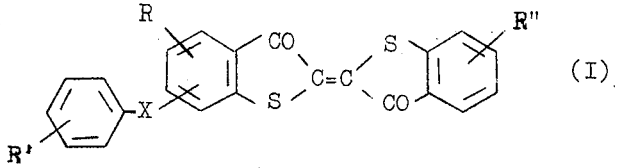

(I)

wherein
R is a hydrogen atom or a lower alkyl group preferably having 1 to 4 carbon atoms;
R' is a member selected from the group consisting of
1. a hydrogen atom,
2. halogen atoms,
3. lower alkyl groups preferably having 1 to 4 carbon atoms,
4. lower alkoxy groups preferably having 1 to 4 carbon atoms,
5. a sulfonamide group the amide group of which can be optionally substituted with a member selected from the group consisting of
   i. a lower alkyl group preferably having 1 to 4 carbon atoms which alkyl group can be optionally substituted with
      a. a hydroxyl group,
      b. a lower alkoxy group preferably having 1 to 4 carbon atoms or
      c. a cyano group,
   ii. a cyclohexyl group,
   iii. aralkyl groups and
   iv. a phenyl group which can be substituted in its optional position with
      a. a lower alkyl group preferably having 1 to 4 carbon atoms,
      b. a chlorine atom or
      c. a lower alkoxy group preferably having 1 to 4 carbon atoms, and
6. aryl sulfonate groups the aryl group of which can be substituted in its optional positions with
   i. a halogen atom,
   ii. a lower alkyl group preferably having 1 to 4 carbon atoms or
   iii. a lower alkoxy group preferably having 1 to 4 carbon atoms;
R" is a hydrogen atom or methyl group; and
X is an oxygen atom or sulfur atom.

The organic materials which can be colored in accordance with the present invention include any synthetic or semisynthetic high molecular weight compound which can be formed into fiber, extrudate, casting or molded article. The organic material may be synthetic or semisynthetic resins such as amino-formaldehyde resins (for example, urea-formaldehyde resin), polymers and copolymers of methacrylic acid esters, polymers and copolymers of vinyl chloride, polymers and copolymers of vinylidene chloride, polymers and copolymers of olefins (for example, polyethylene and polypropylene), styrene polymers and copolymers, polyamide resins, polyacrylic resins, polyacetal resins, cellulose esters (for example, cellulose triacetate), and especially polyester resins.

DETAILED DESCRIPTION OF THE INVENTION

Thioindigoid compounds have previously been well known as vat dyes and applied to the dyeing of cellulose fibers, but for dyeing of man-made fibers, especially, polyester fibers, they have little dyeability. Therefore, to treat polyester fibrous articles with the itherto known thioindigoid compounds by conventional exhausting methods in aqueous media has shown ttle effect and has been practically useless.

The asymmetric thioindigoid compounds of formula I) have not been known yet. We, as a result of an ntensive colorant test on organic materials with the hioindigoid compounds, discovered that the compounds of formula (I) color synthetic organic high molecular weight compounds, especially polyester materials, in brilliant nuance with characteristic fluorescence, and thus completed the invention.

These discoveries are not anticipated from the facts known heretofore. The compounds of formula (I) having a good affinity for polyester materials, can be applied by the same procedures as those employed with rdinary disperse dyestuffs for polyester materials, and can color the articles in brilliant nuance ranging from reddish orange to red shade with fluorescence with various superior fastness characteristics.

Therefore, the compounds of formula (I) are suitable for use in printing polyester fabrics.

The asymmetric thioindigoid compounds of the invention are easily synthesized by known methods as follows:

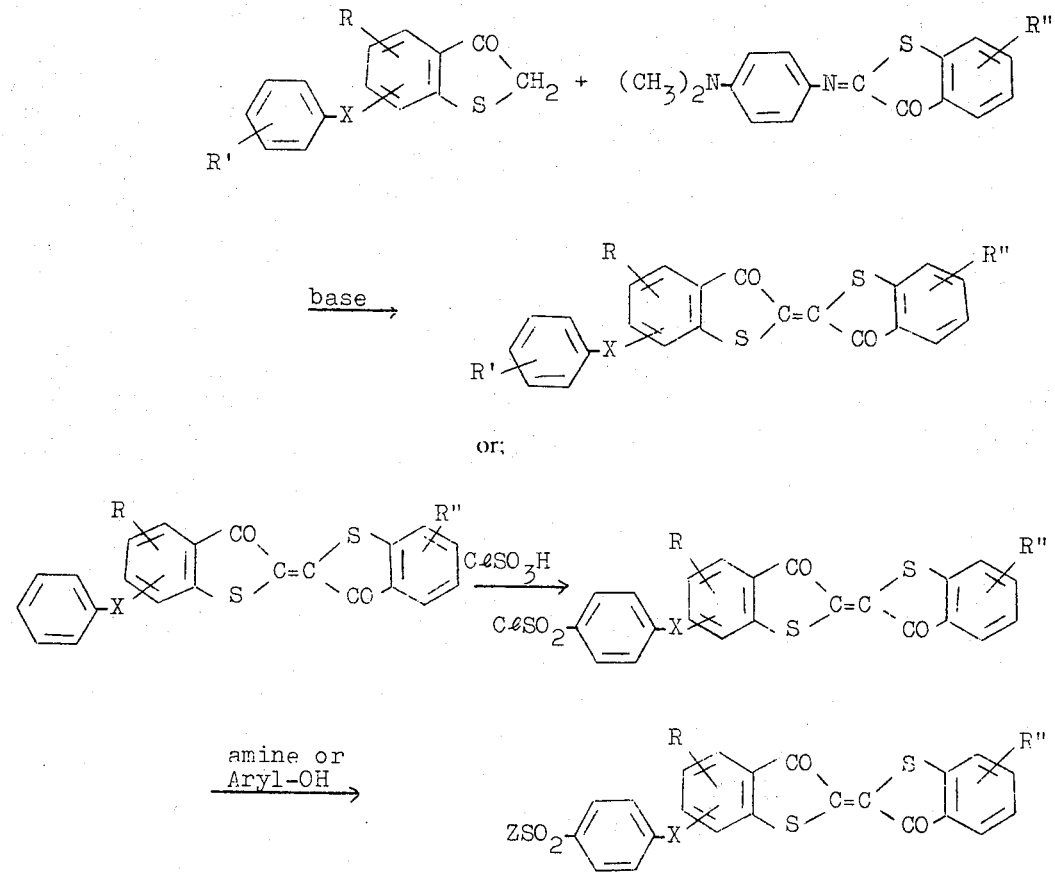

wherein Z is a substituted or unsubstituted amino group or aryloxy group.

The thionaphthenone intermediates can be obtained, for example, according to the procedure:

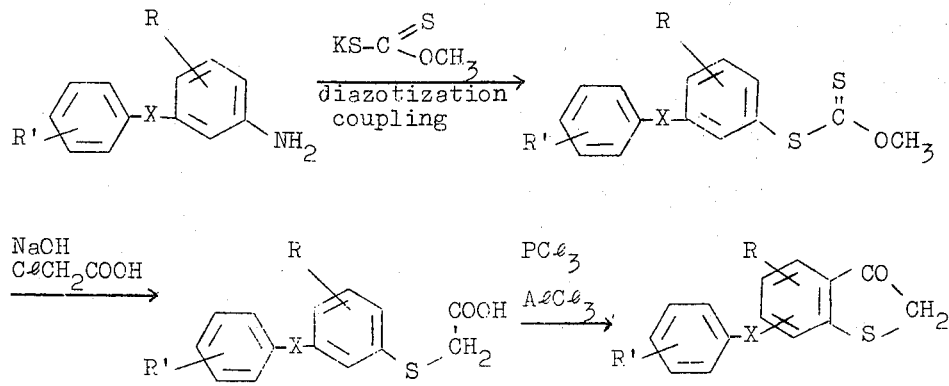

wherein R, R' and X are the same as those defined for formula (I).

Thus, for example, from 6-phenoxythionaphthenone-3- and 2-(4'-dimethylaminophenylimino)thionaphthenone-3, 6-phenoxythioindigo (m.p. 240° – 242°C) is obtained. Similarly, 6-thiophenoxythioindigo (m.p. 225° – 227°C), 6-(p-cresoxy)thioindigo (m.p. 236.5° – 238°C) and 6-(p-chlorophenoxy)thioindigo (m.p. 255° – 256°C) are synthesized. From 6-phenoxythioindigo are obtained 6-(p-dimethylsulfamoylphenoxy)thioindigo (m.p. 278° – 280°C) and 6-(p-phenoxysulfophenoxy)thioindigo (m.p. 204° – 205°C) through the preceding scheme. Therefore, we do not think it necessary to describe specific synthesizing methods for the compounds of formula (I) in this application.

The compounds which provide the group Z are, for example, amines such as ammonia, methylamine, ethylamine, n-butylamine, cyclohexylamine, benzylamine, phenethylamine, dimethylamine, dibutylamine, dicyclohexylamine, ethanolamine, γ-methoxypropylamine, γ-butoxypropylamine, cyanoethylamine, aniline, toluidine, chloroaniline, anisidine, benzidine, dichlorobenzidine, tolidine, methylenedianiline or dichloromethylenedianiline; or phenols such as phenol, cresol, xylenol, chlorophenol, ethylphenol, butylphenol, guaiacol, p-methoxyphenol, guaetol, α-naphthol or β-naphthol.

In Table 1, typical examples of the compounds used for this invention are shown although the present invention is not limited thereto. The shade of polyester fabric dyed therewith using a dyeing procedure such as that described in Example 1 or 2 is specified.

Table 1

| Compound No | Structural formula | Shade of the polyester dyed article |
|---|---|---|
| 1 | | Reddish—Orange |
| 2 | | Ditto |
| 3 | | Ditto |
| 4 | | Ditto |
| 5 | | Pink |
| 6 | | Orange—Red |

Table -1- (continued)

| Compound No | Structural formula | Shade of the polyester dyed article |
| --- | --- | --- |
| 7 | [structure: phenyl–O–phenyl–CO–S–C=C–S–CO with tolyl (CH$_3$) group] | Reddish-Orange |
| 8 | [structure: C$_2$H$_5$O–phenyl–O–phenyl–CO–S–C=C–S–CO with tolyl (CH$_3$) group] | Reddish-Orange |
| 9 | [structure: (CH$_3$)$_3$C–phenyl–O–phenyl–CO–S–C=C–S–CO–phenyl] | Ditto |
| 10 | [structure: (CH$_3$)$_2$NSO$_2$–phenyl–O–phenyl–CO–S–C=C–S–CO–phenyl] | Red |
| 11 | [structure: CH$_3$O(CH$_2$)$_3$NHSO$_2$–phenyl–O–phenyl–CO–S–C=C–S–CO–phenyl] | Ditto |
| 12 | [structure: phenyl–OSO$_2$–phenyl–O–phenyl–CO–S–C=C–S–CO–phenyl] | Ditto |
| 13 | [structure: 2,4-dimethyl-phenyl–OSO$_2$–phenyl–O–phenyl–CO–S–C=C–S–CO–phenyl] | Ditto |

Organic materials can be easily colored with the compounds of formula (I) by any ordinarily practiced method. For example, a fibrous material, such as yarns and fabrics, can be colored by fixing, at 50° to 140°C, in aqueous medium by the conventional exhausting method, at 100° to 150°C by the conventional printing with saturated steam (applicable 150° to 180°C superheated steam), or at a suitable temperature (100° to 200°C) consistent with the type of fiber using dry heat by the conventional thermosol method. The application of the thermosol method is especially preferable to for dyeing polyester fabrics at a treating temperature of 180° to 220°C.

When the organic material to be colored is a film, coating, casting or a molded or extruded article, it can be colored by admixing the compound of formula (I) with a resin or polymer during the preparation of such a resin or polymer, or before it is used to form such an article, or during the formation of such a resin into the article. Also, a resin based pigment having reddish orange to red shade with fluorescence can be obtained by mixing the compounds of formula (I) into the resin or polymer or other properly selected organic materials in molten form.

Table 2 shows the differences between the two reddish orange dyeings of polyester which were obtained according to the present invention and the aforesaid OLS No. 2,401,981 respectively.

similar to those on the polyester cloth were obtained.

Example 2

One part of a finely granulated sample of compound No. 2 (6-chlorophenoxythioindigo obtained in the same manner as described in Example 1 was dispersed in 20 parts of water containing 0.04 part of a polyoxyethylene alkyl ether as a surface active agent.

A polyester cloth was dipped in this aqueous dispersion and impregnated with the dispersion at a pick-up of 40 – 50%. This treated cloth was dried, heat treated at 180°C. for 1 minute, washed with a dilute surface active agent solution, washed with water and dried to provide a dyed cloth of clear reddish orange color having an orange fluorescence, light fastness of 5th grade (JIS L 0842-1971) and sublimation fastness of 4th grade (JIS L 0879-1968:B).

Table 2

| Invention | Compound | Hue | Build up | Sublimation fastness* |
|---|---|---|---|---|
| OLS 2,401,981 | 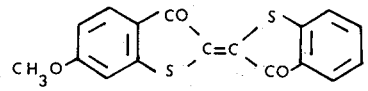 | Reddish-orange | Poor | 3(0.6% of owf) |
| Present Invention | 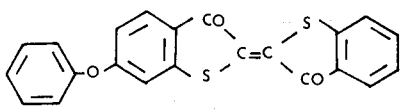 | Ditto | Excellent | 4(0.6% owf) |

*JIS L 0879-1968:B

According to the present invention, it is possible to obtain reddish orange to red dyeings of organic materials in brilliant nuance with characteristic fluorescence and excellent fastness, which cannot be achieved by the method of the OLS No. 2,401,981.

The following examples are presented in which all parts are on a weight basis and the compound numbers refer to the compounds described in Table 1.

Example 1

One part of compound No. 1 (6-phenoxythioindigo) was ground together with 0.5 part of a sodium alkylbenzenesulfonate or alkylarylpolyoxyethylene ether as a surface active agent and 2 parts of water for a sufficient time to provide a finely granulated powder which was diluted with water to provide 10 parts of a finely granulated aqueous dispersion, 0.2 part of this dispersion was added to an aqueous bath containing 1 part of a higher alcohol sulfate type surface active agent to provide 500 parts of a treating bath. 10 parts of a polyester cloth was immersed in this treating bath maintained at 130°C. for 40 minutes and was water-washed and dried. The dyed cloth showed a clear reddish orange color having an orange fluorescence and its light fastness and sublimation fastness were 5th grade (JIS L 0842-1971) and 4th grade (JIS L 0879-1968:B) respectively. Similarly, a dyed cloth showing a similar color, having similar fluorescence and fastnesses was obtained by using compounds No. 2, 3, 4, 7, 8 and 9 respectively instead of compound No. 1 mentioned above. A triacetate cloth, instead of the polyester cloth, was treated in the same manner as above, and results

Example 3

An aqueous dispersion of compound No. 1 was provided in the same way as described in Example 1. Then, a color paste of the following recipe was printed in a pattern on a polyester cloth.

| Dispersion of dyes in Example 1 | 3 | parts |
|---|---|---|
| Water | 36 | " |
| Stock thickening | 60 | " |
| Anti reductant | 1 | " |
| [Stock thickening was prepared as follows: | | |
| Neugen ET (surface active agent made by Daiichi-Kogyo-Seiyaku K.K.) | 1 | part |
| Water | 14 | parts |
| Turpentine oil | 35 | " |
| 5% Sodium alginate water solution | 50 | " |
| were thoroughly mixed in half emulsion.] | | |

The printed cloth was steam-heated at 150° to 180°C. for 3 to 5 minutes in a high temperature steamer, washed with a dilute solution of a surface active agent, then washed with water and dried. The pattern of the cloth obtained showed a clear reddish orange color, and its dyeing fastness characteristics were similar to those of the dyeings obtained in Example 1. Similarly, with the compound No. 12 the pattern having clear reddish orange color and sublimation fastness of 5th grade (JIS L 0879-1968:B) was obtained.

Example 4

A uniform mixture consisting of 0.1 part of compound No. 4 [6-(4'-methylphenoxy)thioindigo], 50 parts of polyvinylchloride and 50 parts of dioctylphthalate was kneaded at 150°C, for 10 minutes and was then pressed for 5 minutes between metal plates heated to 160°C. to make a sheet with a thickness of about 0.5 mm.

The sheet thus obtained showed a clear reddish orange color emitting an orange fluorescence.

Example 5

0.01 part of compound No. 5 (6-thiophenoxythioindigo) was added to 10 parts of polystyrene, kneaded at 180°C. for several minutes and was then pressed to a plate 5 mm thick.

The polystyrene plate thus obtained showed a clear pink color with fluorescence.

Example 6

20 parts of an unmodified melamine-formaldehyde resin was mixed into 50 parts of a sulfonamide resin melted at 120°C.

The resulting mixture was heated to 170° – 180°C. and 1 part of compound No. 7 (6-phenoxy-6'-methyl-thioindigo) was mixed with the mixture.

The mixture was completely dissolved, then cooled, solidified and then crushed to obtain a reddish-orange fluorescence pigment emitting an orange fluorescence.

What is claimed is:

1. A method for dyeing synthetic or semi-synthetic polymeric fibres with an asymmetric thioindigoid compound having the formula:

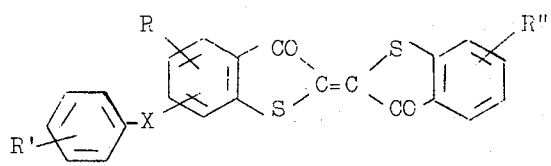

wherein

R is a hydrogen atom or lower alkyl group;

R' is a member selected from the group consisting of
  1. a hydrogen atom,
  2. halogen atoms,
  3. lower alkyl groups,
  4. lower alkoxy groups,
  5. a sulfonamide group the amide group of which may be substituted with a member selected from the group consisting of
    i. lower alkyl groups which may be substituted with
      a. a hydroxyl group,
      b. lower alkoxy group or
      c. cyano group,
    ii. a cyclohexyl group,
    iii. aralkyl groups and
    iv. a phenyl group which may be substituted with
      a. a lower alkyl group,
      b. chlorine atom or
      c. lower alkoxy group, and
  6. aryl sulfonate groups the aryl group of which may be substituted with
    i. a halogen atom,
    ii. lower alkyl group or
    iii. lower alkoxy group;

R'' is a hydrogen atom or methyl group; and

X is an oxygen atom or sulfur atom.

2. The method as claimed in claim 1, wherein R and R'' are a hydrogen atoms; and R' is a member selected from the group consisting of a hydrogen atom, chlorine atom, lower alkyl groups and lower alkoxy groups.

3. The method as claimed in claim 1, wherein R and R'' are a hydrogen atom; and R' is a member selected from the group consisting of
  1. a sulfonamide group the amide group which may be substituted with alkyl groups which may be substituted with a lower alkoxy group and
  2. aryl sulfonate groups the aryl group of which may be substituted with
    i. a halogen atom,
    ii. lower alkyl group or
    iii. lower alkoxy group.

4. The method as claimed in claim 2, wherein the asymmetric thioindigoid compound has the formula:

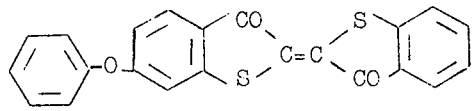

5. The method as claimed in claim 2, wherein the asymmetric thioindigoid compound has the formula:

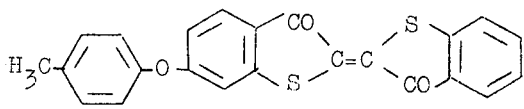

6. The method as claimed in claim 2, wherein the asymmetric thioindigoid compound has the formula:

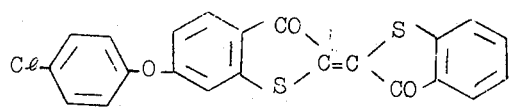

7. The method as claimed in claim 3, wherein the asymmetric thioindigoid compound has the formula:

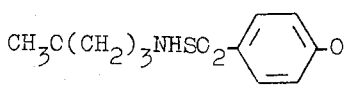

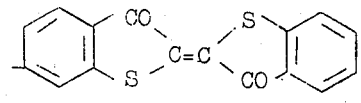

8. The method as claimed in claim 3, wherein the asymmetric thioindigoid compound has the formula:

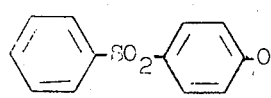

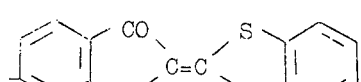

* * * * *